United States Patent
Kumamoto et al.

(10) Patent No.: US 9,303,116 B2
(45) Date of Patent: Apr. 5, 2016

(54) EPOXY RESIN CURING AGENT, EPOXY RESIN COMPOSITION, AND ADHESIVE AGENT FOR LAMINATE

(75) Inventors: Kana Kumamoto, Kanagawa (JP); Eiichi Honda, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 13/581,379

(22) PCT Filed: Mar. 11, 2011

(86) PCT No.: PCT/JP2011/055833
§ 371 (c)(1),
(2), (4) Date: Aug. 27, 2012

(87) PCT Pub. No.: WO2011/115020
PCT Pub. Date: Sep. 22, 2011

(65) Prior Publication Data
US 2012/0321227 A1    Dec. 20, 2012

(30) Foreign Application Priority Data
Mar. 16, 2010    (JP) ................................ 2010-059282

(51) Int. Cl.
*B32B 1/02*    (2006.01)
*C08G 59/54*    (2006.01)
*C09J 163/00*    (2006.01)
*B32B 1/08*    (2006.01)

(52) U.S. Cl.
CPC ............... *C08G 59/54* (2013.01); *C09J 163/00* (2013.01)

(58) Field of Classification Search
CPC .... Y10T 428/1352; B32B 1/02; C08G 59/54; C09J 163/00
USPC ...................... 428/34.1, 34.2, 35.7, 35.9, 36.9
See application file for complete search history.

(56) References Cited

U.S. PATENT DOCUMENTS

| | | | | |
|---|---|---|---|---|
| 7,387,699 B2 * | 6/2008 | Ideno et al. | .................... | 156/196 |
| 7,425,598 B2 * | 9/2008 | Kutsuna et al. | ................ | 525/531 |
| 8,128,782 B2 | 3/2012 | Yonehama et al. | ............ | 156/330 |
| 8,481,654 B2 * | 7/2013 | Edelmann et al. | ............ | 525/477 |
| 2002/0120063 A1 | 8/2002 | Kutsuna et al. | ................ | 525/107 |
| 2005/0014908 A1 | 1/2005 | Kutsuna et al. | ................ | 525/523 |
| 2007/0049708 A1 | 3/2007 | Kutsuna et al. | ................ | 525/529 |
| 2009/0239069 A1 | 9/2009 | Yonehama et al. | | |

FOREIGN PATENT DOCUMENTS

| | | |
|---|---|---|
| JP | 5-51574 | 3/1993 |
| JP | 9-316422 | 12/1997 |
| JP | 2000-154365 | 6/2000 |
| JP | 2002-256208 | 9/2002 |
| JP | 2003-155465 | 5/2003 |
| WO | 99/60068 | 11/1999 |

OTHER PUBLICATIONS

U.S. Appl. No. 13/640,158 to Nobuhiko Matsumoto et al., filed Oct. 9, 2012.
Search report from International Application No. PCT/JP2011/055833, mail date is May 24, 2011.
European search report issued with respect to application No. 11756206, mail date is Jul. 29, 2015.

* cited by examiner

*Primary Examiner* — Marc A Patterson
(74) *Attorney, Agent, or Firm* — Greenblum & Bernstein, P.L.C.

(57) ABSTRACT

An epoxy resin curing agent which provides good adhesiveness to polyester in addition to excellent performance and high gas-barrier properties of epoxy resins, an epoxy resin composition containing the epoxy resin curing agent, an adhesive for laminating which mainly contains the composition, a laminate film obtained by using the adhesive, a multilayer packaging material, and a packaging bag. The epoxy resin curing agent is a reaction product of (A) m-xylylenediamine or p-xylylenediamine, (B) a polyfunctional compound having one acyl group, which forms amide linkage by a reaction with polyamine and is capable of forming an oligomer; and (C) an aromatic dicarboxylic acid, an ester thereof, an amide thereof, an acid anhydride thereof, or an acid chloride thereof.

8 Claims, No Drawings

EPOXY RESIN CURING AGENT, EPOXY RESIN COMPOSITION, AND ADHESIVE AGENT FOR LAMINATE

TECHNICAL FIELD

The present invention relates to epoxy resin curing agents which provide high gas-barrier properties, long pot life, and excellent adhesiveness and epoxy resin compositions comprising the epoxy resin curing agent. The present invention further relates to adhesives for laminating which mainly comprise epoxy resin composition, laminate films obtained by using the adhesive, multi-layer packaging materials, and packaging bags.

BACKGROUND ART

Recently, a packaging material is mainly constructed from a composite flexible film made of a combination of different polymer materials in view of its strength, protection ability of contents, workability, and marketing effect by printing. The composite film is generally composed of an outer thermoplastic film layer for protecting contents and a sealant thermoplastic film layer. These layers are laminated by a dry lamination wherein a sealant layer is bonded to a laminating film layer through an adhesive applied on the lamination film layer or by an extrusion lamination where a molten plastic film for forming a sealant layer is press-bonded to a laminating film layer optionally having an anchor coat agent applied thereon so as to form a laminate of films. In these methods, a two-part polyurethane adhesive including a main ingredient having an active hydrogen-containing group, such as hydroxyl group, and a curing agent having an isocyanate group has been mainly used in view of its high adhesiveness (for example, Patent Documents 1 and 2).

However, the rate of curing reaction of the two-part polyurethane adhesive is generally not so high. Therefore, to obtain sufficient adhesiveness, the curing must be promoted by a long-term aging as long as for 1 to 5 days after laminating the layers. In addition, if the isocyanate group in the curing agent remains unreacted after curing, the residual isocyanate group is allowed to react with moisture in the ambient atmosphere to generate carbon dioxide which then forms air bubbles in the laminate film.

To solve these problems, a specific polyurethane adhesive for dry laminating is proposed in Patent Document 3, and an epoxy adhesive for laminating is proposed in Patent Document 4.

However, the gas-barrier properties of the polyurethane adhesives proposed in Patent Documents 1 to 3 and the epoxy adhesive proposed in Patent Document 4 are not so high. Therefore, if a packaging material having high gas-barrier properties is intended, an additional gas-barrier layer of various kinds, such as a polyvinylidene chloride (PVDC) coat layer, a polyvinyl alcohol (PVA) coat layer, an ethylene-vinyl alcohol copolymer (EVOH) film layer, a m-xylylene adipamide film layer, and an inorganic film layer of deposited alumina ($Al_2O_3$) or silica (Si), must be laminated, increasing the production costs of laminated film and reducing the workability of laminating process.

Since, as compared with other resins, epoxy resins are excellent in many properties, such as adhesiveness to various materials, heat resistance, chemical resistance, electrical properties, and mechanical properties, epoxy resins are finding wide application in various industries, for example, as adhesives for civil engineering and construction. The gas-barrier properties of an epoxy resin composition for use as an adhesive are generally better than those of urethane resin, acrylic resin, and polyolefin resin, but inferior to those of polyvinylidene chloride and polyvinyl alcohol which are known as gas-barrier materials. Therefore, to improve the gas-barrier properties of epoxy resin, various methods are employed, for example, increasing the film thickness, coating the film with other material, and combinedly using filler.

Patent Document 5 proposes a gas-barrier epoxy resin composition which includes an epoxy resin and an amine curing agent. The gas-barrier properties of the proposed epoxy resin composition are good, but further improvement is recently required. In addition, the adhesiveness to polyester is insufficient and its improvement is required.

PRIOR ART

Patent Documents

Patent Document 1: JP 5-51574A
Patent Document 2: JP 9-316422A
Patent Document 3: JP 2000-154365A
Patent Document 4: WO 99/60068
Patent Document 5: JP 2002-256208A

SUMMARY OF THE INVENTION

Problems to be Solved by the Invention

Objects of the present invention is to provide an epoxy resin curing agent capable of realizing good adhesiveness to polyester while ensuring excellent properties and high gas-bather properties inherent in epoxy resin, an epoxy resin composition comprising the epoxy resin curing agent, an adhesive for laminating mainly comprising the composition, a laminate film obtained by using the adhesive, a multi-layer packaging material, and a packaging bag.

Means for Solving the Problems

As a result of extensive research in view of solving the above problems, the inventors have found that a specific epoxy resin curing agent, an epoxy resin composition, or an adhesive for laminating mainly comprising the epoxy resin composition provides excellent properties and high gas-barrier properties of epoxy resin, and high adhesiveness to polyester. The present invention is based on this finding. Namely, the present invention provides:

1. an epoxy resin curing agent comprising a reaction product of components (A), (B), and (C):
(A) m-xylylenediamine or p-xylylenediamine;
(B) a polyfunctional compound having one acyl group, which forms amide linkage by a reaction with polyamine and is capable of forming an oligomer; and
(C) an aromatic dicarboxylic acid, an ester thereof, an amide thereof, an acid anhydride thereof, or an acid chloride thereof;
2. the epoxy resin curing agent of item 1, wherein the component (A) is m-xylylenediamine;
3. the epoxy resin curing agent of item 1 or 2, wherein the component (B) is acrylic acid, methacrylic acid, an ester thereof, an amide thereof, an acid anhydride thereof, or an acid chloride thereof;
4. the epoxy resin curing agent of any one of items 1 to 3, wherein the component (C) is isophthalic acid, terephthalic acid, an ester thereof, an amide thereof, an acid anhydride thereof, or an acid chloride thereof;

5. the epoxy resin curing agent of any one of items 1 to 4, wherein a reaction molar ratio of the component (C) and the component (A), (C)/(A), is 0.10 to 0.35;

6. an epoxy resin composition comprising an epoxy resin and the epoxy resin curing agent of any one of items 1 to 5;

7. the epoxy resin composition of item 6, wherein a ratio of a number of active amine hydrogens in the epoxy resin curing agent to a number of epoxy groups in the epoxy resin:

Number of active amine hydrogens in epoxy resin curing agent/Number of epoxy groups in epoxy resin is 1.0 to 30.0;

8. the epoxy resin composition of item 6 or 7, wherein a cured product of the epoxy resin composition has an oxygen permeability coefficient of 2.0 ml·mm/m$^2$·day·MPa at 23° C. and 60% RH;

9. the epoxy resin composition of any one of items 6 to 8, wherein the epoxy resin is at least one resin selected from the group consisting of an epoxy resin having a glycidylamino group derived from m-xylylenediamine, an epoxy resin having a glycidylamino group derived from 1,3-bis(aminomethyl)cyclohexane, an epoxy resin having a glycidylamino group derived from diaminodiphenylmethane, an epoxy resin having a glycidylamino group and/or a glycidyloxy group each derived from p-aminophenol, an epoxy resin having a glycidyloxy group derived from bisphenol A, an epoxy resin having a glycidyloxy group derived from bisphenol F, an epoxy resin having a glycidyloxy group derived from phenol novolac, and an epoxy resin having a glycidyloxy group derived from resorcinol;

10. the epoxy resin composition of any one of items 6 to 8, wherein the epoxy resin is the epoxy resin having a glycidylamino group derived from m-xylylenediamine;

11. an adhesive for laminating which mainly comprises the epoxy resin composition of any one of items 6 to 10;

12. a laminate film produced by using the adhesive for laminating of item 11;

13. a multi-layer packaging material comprising at least one unit of the laminate film of item 12; and 14. a packaging bag produced from the multi-layer packaging material of item 13 having a heat-sealable resin layer, wherein the packaging bag is produced by superposing a surface of the heat-sealable resin layer on another surface of the heat-sealable resin layer and heat-sealing meeting peripheral edge to form a sealed portion.

Effect of the Invention

The present invention provides an epoxy resin curing agent which realizes high gas-barrier properties, long pot life, and excellent adhesiveness to various types of polymer, paper and metal, an epoxy resin composition comprising the epoxy resin curing agent, an adhesive for laminating mainly comprising the composition, a laminate film produced by using the adhesive, a multi-layer packaging material, and a packaging bag. Particularly, the adhesive for laminating of the invention exhibits high adhesiveness to polyester.

In addition to good adhesiveness to various types of film material, the adhesive mainly comprising the epoxy resin composition of the invention is further characterized by high gas-barrier properties. Therefore, the adhesive forms a layer which combines gas-barrier properties and adhesiveness. In the production of conventional laminate film for packaging material, a gas-barrier layer and an adhesive layer for bonding the gas-barrier layer and a sealant layer are separately needed. In contrast, the adhesive for laminating of the invention enables the production of laminate film for packaging material having high gas-barrier properties without separately forming a gas-barrier layer. In addition, the adhesive for laminating of the invention may be used for forming an adhesive layer for bonding a sealant layer and a known gas-barrier layer, such as PVDC coat layer, PVA coat layer, EVOH film layer, m-xylylene adipamide film layer, and inorganic film layer of deposited alumina ($Al_2O_3$) or silica (Si), thereby drastically improving the gas-barrier properties of the film. Further, the drawback of decrease in gas-barrier properties under high humidity conditions generally found in gas-barrier films can be eliminated by combinedly using the adhesive for laminating of the invention together with a gas-barrier film.

The laminate film produced by using the adhesive for laminating of the invention and the packaging material, for example, a packaging bag formed from the laminate film, are excellent in gas-barrier properties to oxygen and water vapor, laminate strength, and heat seal strength, and have necessary mechanical, chemical or physical properties, for example, excellent in heat resistance, water resistance, fragrance preservation, light resistance, chemical resistance, perforation resistance, and other fastness properties. Therefore, the invention provides the packaging material which effectively protects enclosed and packed contents and is excellent in storage and preservation stability and filling and packing efficiency. The products to be contained in packages may include foods, such as confectioneries, staple foods, processed agricultural products, processed animal source products, processed marine products, fruits, vegetables, cocked foods such as frozen dishes and chilled dishes, dairy products, and liquid condiments; cosmetics; and medicines.

Mode for Carrying Out the Invention

The epoxy resin composition of the invention is suitably used as a main ingredient of the adhesive for laminating various gas-permeable materials, for example, plastic films of polyolefin, polyester, polyamide, etc. which are used as a packaging material for foods and medicines. The epoxy resin composition is also usable as a coating material for plastic containers or materials, such as metal and concrete, to which known epoxy resin compositions are applied. Since the epoxy resin composition contains the epoxy resin curing agent, the cured epoxy resin which forms an adhesive layer has highly cohesive amide linkages, to give high gas-barrier properties and good adhesion strength to materials, such as metal, concrete and plastics. The term "main ingredient" referred to herein means that other ingredients may be present as long as the effect of the invention is not adversely affected and the content of the main ingredient is preferably 50% by weight or more, more preferably 70% by weight or more, and still more preferably 90% by weight or more.

Epoxy Resin Curing Agent

The epoxy resin curing agent, the epoxy resin composition comprising the curing agent, and the epoxy resin of the invention will be described below.

The epoxy resin curing agent comprises a reaction product of the following components (A), (B), and (C);

(A) m-xylylenediamine or p-xylylenediamine;

(B) a polyfunctional compound having one acyl group, which forms amide linkage by a reaction with polyamine and is capable of forming an oligomer; and (C) an aromatic dicarboxylic acid, an ester thereof, an amide thereof, an acid anhydride thereof, or an acid chloride thereof.

In view of gas-barrier properties, the component (A) is preferably m-xylylenediamine or p-xylylenediamine and more preferably m-xylylenediamine. These compounds may be used alone or in combination.

The component (B) is a polyfunctional compound having one acyl group, which forms amide linkage by a reaction with polyamine and is capable of forming an oligomer. Examples of the polyfunctional compound (B) include a carboxylic acid, such as acrylic acid, methacrylic acid, cinnamic acid, and crotonic acid, and a derivative of the carboxylic acid, for example, an ester, an amide, an acid anhydride, and an acid chloride. In view of the reactivity with amine and gas-barrier properties, preferred axe those having a carbon-carbon double bond conjugated with the acyl group and having no substituent at β-position, as in the case of acrylic acid, methacrylic acid and their derivatives mentioned above.

The polyfunctional compound (B) may be used alone or in combination of two or more.

Examples of the component (C) include a carboxylic acid, such as isophthalic acid, terephthalic acid, and naphthalenedicarboxylic acid, and a derivative of the carboxylic acid, for example, an ester, an amide, an acid anhydride, and an acid chloride, with isophthalic acid, terephthalic acid, and a derivative thereof as mentioned above being preferred in view of the solubility.

The component (C) may be used alone or in combination of two or more.

If the component (B) or (C) is the carboxylic acid or its derivative, such as ester and amide, the component (A) and the component (B) or (C) are mixed preferably at 0 to 100° C. and more preferably at 0 to 70° C. and then the amide linkage-forming reaction is allowed to proceed with elimination of water, alcohol, or amine at 100 to 300° C. and preferably at 120 to 250° C. The components (B) and (C) may be reacted with the component (A) in any order or the reaction may be conducted after mixing all the components at a time. In view of the reactivity of the component (C) with amine, it is recommended to allow the component (A) to first react with the component (C) for the amide linkage formation.

For example, (i) the reaction is conducted by charging the components (A) and (C), regulating the temperature within 0 to 100° C., preferably 0 to 70° C., adding the component (B), and then elevating the temperature to 100 to 300° C., preferably 120 to 250° C. to allow the amide linkage-forming reaction to proceed, or (ii) the reaction is conducted by charging the components (A) and (C), elevating the temperature to 100 to 300° C., preferably 120 to 250° C. to allow the amide linkage-forming reaction to proceed, cooling to 0 to 100° C., preferably 0 to 70° C., adding the component (B), and then elevating the temperature to 100 to 300° C., preferably 120 to 250° C. to allow the ester-amide exchange reaction to proceed.

To complete the above amide linkage-forming reaction, the reaction apparatus may be evacuated at final stage of the reaction, if necessary. The reactants may be diluted with a non-reactive solvent, if necessary. Further, the reaction may be conducted in the presence of a catalyst for promoting the elimination of water or alcohol, such as an ester of phosphorous acid.

If the component (B) or (C) is an acid anhydride or an acid chloride, the amide linkage-forming reaction is conducted at 0 to 150° C. and preferably 0 to 100° C.

To complete the above amide linkage-forming reaction, the reaction apparatus may be evacuated at final stage of the reaction, if necessary. The reactants may be diluted with a non-reactive solvent, if necessary. Further, the reaction may be conducted in the presence of a tertiary amine, such as pyridine, picoline, lutidine, and trialkylamine.

The amide linkages introduced by the above reactions are highly cohesive. Therefore, if the amide linkages are present in the epoxy resin curing agent in a high content, higher oxygen-barrier properties and high adhesive strength to a material, such as metal, concrete and plastics, are obtained.

The reaction molar ratio of the components (B) and (A), (B)/(A), is preferably 0.3 to 0.95, more preferably 0.5 to 0.9, and still more preferably 0.6 to 0.8. Within the above ranges, the amide linkages are introduced to the epoxy resin curing agent in a sufficient amount, and the amount of the amino groups is enough to the reaction with the epoxy resin. Therefore, an epoxy resin curing agent exhibiting high gas-barrier properties and excellent film-forming properties with good workability is obtained.

The reaction molar ratio of the components (C) and (A), (C)/(A), is 0.10 to 0.35, preferably 0.15 to 0.30, and particularly preferably 0.20 to 0.30. If the molar ratio is 0.10 or more, good adhesiveness is obtained. If the molar ratio is 0.35 or less, the workability in coating operation is good. The reaction molar ratio of the components (B) and (C) to the component (A), [(B)+(C)]/(A), is preferably 0.4 to 0.97. If being 0.4 or more, a sufficient amount of amide linkages is introduced to the epoxy resin curing agent, and high gas-barrier properties and good adhesiveness are obtained. In addition, the amount of volatile compounds remaining in the epoxy resin curing agent is favorably limited to a range which is proper for avoiding the emission of offensive odor from a resulting cured product. Further, the amount of the hydroxyl groups generated in a resulting cured product by the reaction between the epoxy groups and the amino groups is regulated within a range suitable for keeping the oxygen-barrier properties high under high humidity conditions. If being 0.97 or less, the amount of the amino group to react with the epoxy resin is proper to give a cured product having excellent impact resistance and heat resistance and high solubility in various organic solvents and water. Particularly, in view of obtaining a cured product having high gas-barrier properties, high adhesiveness, preventing the emission of offensive odor, and keeping the oxygen-barrier properties high under high humidity conditions, the molar ratio of the polyfunctional compound to the polyamine components is more preferably 0.6 to 0.97.

Epoxy Resin Composition

The epoxy resin composition of the invention comprises an epoxy resin and the epoxy resin curing agent mentioned above. The oxygen permeability coefficient of the cured product of the epoxy resin composition is preferably 2.0 ml·mm/m$^2$·day·MPa or less at 23° C. and 60% RH, more preferably 1.5 ml·mm/m$^2$·day·MPa or less at 23° C. and 60% RH, and still more preferably 1.0 ml·mm/m$^2$·day·MPa or less at 23° C. and 60% RH. The oxygen permeability coefficient is determined by the method described below.

The epoxy resin included in the epoxy resin composition may be any of a saturated or unsaturated aliphatic compound, a saturated or unsaturated alicyclic compound, an aromatic compound, and a heterocyclic compound, with an epoxy resin having an aromatic ring in its molecule being preferred in view of exhibiting high gas-barrier properties.

Examples thereof include at least one resin selected from the group consisting of an epoxy resin having a glycidylamino group derived from m-xylylenediamine, an epoxy resin having a glycidylamino group derived from 1,3-bis(aminomethyl)cyclohexane, an epoxy resin having a glycidylamino group derived from diaminodiphenylmethane, an epoxy resin having a glycidylamino group and/or a glycidyloxy group each derived from p-aminophenol, an epoxy resin having a glycidyloxy group derived from bisphenol A, an epoxy resin having a glycidyloxy group derived from bisphenol F, an epoxy resin having a glycidyloxy group derived from phenol novolac, and an epoxy resin having a glycidyloxy group derived from resorcinol, with the epoxy resin having a glycidylamino group derived from m-xylylenediamine being particularly preferred in view of the gas-barrier properties.

To improve the properties, such as flexibility, impact resistance, and moist heat resistance, various kinds of the epoxy resins mentioned above may be mixed in a proper proportion.

The epoxy resin is obtained by the reaction of epihalohydrin with alcohol, phenol compound or amine. For example, the epoxy resin having a glycidylamino group derived from m-xylylenediamine is obtained by the addition reaction of epichlorohydrin to m-xylylenediamine. Since m-xylylenediamine has four amino hydrogens, mono-, di-, tri- and tetraglycidyl compounds are formed. The number of glycidyl groups can be changed by changing the reaction ratio of m-xylylenediamine and epichlorohydrin. For example, an epoxy resin having four glycidyl groups is mainly obtained by the addition reaction using epichlorohydrin about four times by mole the amount of m-xylylenediamine.

The epoxy resin is synthesized by the reaction of alcohol, phenol compound or amine with an excessive amount of epihalohydrin in the presence of an alkali, such as sodium hydroxide, at 20 to 140° C., preferably at 50 to 120° C. for alcohol and phenol compound and at 20 to 70° C. for amine and the separation of the by-produced alkali halide.

The number average molecular weight of the epoxy resin varies depending upon the molar ratio of alcohol, phenol compound or amine to epihalohydrin and is preferably about 80 to 4000, more preferably about 200 to 1000, and still more preferably about 200 to 500.

In addition to the epoxy resin curing agent of the invention, the epoxy resin composition may contain, if necessary, another type of epoxy resin curing agent as long as the effect of the invention is not adversely affected. Such another type of epoxy resin curing agent may be any of an aliphatic compound, an alicyclic compound, an aromatic compound, and a heterocyclic compound and may include polyamine, phenol compound, acid anhydride, and carboxylic acid which are generally used as the epoxy resin curing agent. The epoxy resin curing agent other than that of the invention is selected according to the use of laminate film and the properties required in such use.

The epoxy resin composition is cured at a concentration of the composition and temperature each being enough to obtain a cured product of the composition, although depending upon the ingredients of the composition. Namely, depending upon the kinds and molar ratio of the ingredients, the concentration of the composition can widely vary from the non-diluted state without using a solvent to about 5% by weight when diluted with an appropriate organic solvent and/or water. Similarly, the curing temperature is selected from the range of room temperature to about 140° C.

Examples of suitable solvents include glycol ethers, such as 2-methoxyethanol, 2-ethoxyethanol, 2-propoxyethanol, 2-butoxyethanol, 1-methoxy-2-propanol, 1-ethoxy-2-propanol, and 1-propoxy-2-propanol; alcohols, such as methanol, ethanol, 1-propanol, 2-propanol, 1-butanol, and 2-butanol; aprotic polar solvents, such as N,N-dimethylformamide, N,N-dimethylacetamide, dimethyl sulfoxide, and N-methylpyrrolidone; and water-insoluble solvents, such as toluene, xylene, and ethyl acetate, with water-soluble solvents, such as glycol ethers and alcohols, being preferred in view of the solubility of the epoxy resin curing agent.

The epoxy resin and the epoxy resin curing agent for the epoxy resin composition may be blended in a blending ratio regularly employed in the production of a reaction product of the epoxy resin and the epoxy resin curing agent. Specifically, the ratio of the number of active amine hydrogens in the epoxy resin curing agent to the number of epoxy groups in the epoxy resin (active amine hydrogen number in epoxy resin curing agent/epoxy group number in epoxy resin) is 1.0 to 30.0 and preferably 2.0 to 20.0.

The epoxy resin composition may be blended with a thermosetting resin, such as polyurethane resin, polyacrylic resin, and polyurea resin, if necessary, as long as the effect of the invention is adversely affected.

If intended to be used for coating a general-purpose material, such as metal, concrete, and plastics, the gas-barrier epoxy resin composition of the invention may contain a deforming agent or a wetting agent each comprising a silicone compound or an acrylic compound so as to promote the elimination of foams generated during the mixing operation under stirring or coating operation or easily make the surface of the material wettable.

Examples of suitable defoaming agent include BYK019, BYK052, BYK065, BYK066N, BYK067N, BYK070, and BYK080 each being available from BYK-Chemie GmbH, with BYK065 being particularly preferred.

Examples of suitable wetting agent include BYK331, BYK333, BYK340, BYK344, BYK347, BYK348, BYK378, and BYK381 each being available from BYK-Chemie GmbH. The wetting agent may be added preferably 0.01 to 2.0% by weight based on the total amount of the reactants to be subjected to the curing reaction.

To improve properties, such as impact resistance, the epoxy resin composition may be added with organic filler, such as silica, alumina, mica, talc, aluminum flake, and glass flake. The organic filler may be added preferably 0.01 to 10.0% by weight based on the total amount of the epoxy resin composition in view of the above purpose.

To enhance the adhesiveness of the epoxy resin cured product layer to various kinds of materials, the epoxy resin composition may include a coupling agent, such as silane coupling agent and titanate coupling agent.

Commercially available coupling agents are usable. Preferred are those having an organic functional group reactive to the epoxy resin composition of the invention. Examples thereof include aminosilane coupling agents, such as N-(2-aminoethyl)-3-aminopropylmethyldimethoxysilane, N-(2-aminoethyl)-3-aminopropyltrimethoxysilane, 3-aminopropyltriethoxysilane, 3-aminopropyltrimethoxysilane, N,N'-bis[3-(trimethoxysilyl)propyl]ethylenediamine; epoxysilane coupling agents, such as 3-glycidoxy propyltrimethoxysilane, 3-glycidoxy propylmethyldimethoxysilane, 2-(3,4-epoxycyclohexyl)ethyltrimethoxysilane, 3-glycidoxy propyltriethoxysilane; methacryloxysilane coupling agents, such as 3-methacryloxy propyltrimethoxysilane; mercaptosilane coupling agents, such as 3-mercaptopropyltrimethoxysilane; and isocyanatosilane coupling agents, such as 3-isocyanatopropyltriethoxysilane, each being available from Chisso Corporation, Toray Dow Corning Co., Ltd., Shin-Etsu Chemical Co., Ltd., and other manufacturers. Also usable are aminosilane coupling agents, such as SH-6026 and Z-6050 each manufactured by Toray Dow Corning Co., Ltd., and amino group-containing alkoxysilane, such as KP-390 and KC-223 each manufactured by Shin-Etsu Chemical Co., Ltd.

The coupling agent may be added preferably 0.01 to 10.0% by weight based on the total amount of the epoxy resin composition. If used for coating a film deposited with an inorganic compound, such as silica and alumina, the silane coupling agent is used more preferably.

Adhesive for Laminating

The adhesive for laminating of the invention comprises the epoxy resin composition described above as the main ingredient. To improve the tackiness to various kinds of film materials just after coating, the adhesive for laminating may be added with a tackifier, such as xylene resin, terpene resin, phenol resin, and rosin resin, preferably in an amount of 0.01 to 5.0% by weight based on the total weight of the adhesive composition.

The adhesive for laminating may further contain a curing promoter for improving low-temperature curing properties, for example, an amine complex of boron trifluoride, such as monoethylamine complex of boron trifluoride; an ether complex of boron trifluoride, such as dim ethyl ether complex of boron trifluoride, diethyl ether complex of boron trifluoride, and di-n-butyl ether complex of boron trifluoride; an imidazole compound, such as 2-phenylimidazole, benzoic acid, salicylic acid, N-ethylmorpholine, dibutyltin dilaurate, cobalt naphthenate, and tin(II) chloride; an organic solvent, such as benzyl alcohol; a corrosion inhibitor, such as zinc phosphate, iron phosphate, calcium molybdate, vanadium oxide, water-dispersed silica, and fumed silica; an organic pigment, such as phthalocyanine organic pigment and condensed polycyclic organic pigment; and an inorganic pigment, such as titanium oxide, zinc oxide, calcium carbonate, barium sulfate, alumina and carbon black, each in an appropriate amount.

The adhesive for laminating may be added with an oxygen-scavenging compound, if necessary. Examples thereof include a low molecular weight compound reactive with oxygen, such as hindered phenols, vitamin C, vitamin E, organophosphorus compounds, gallic acid, and pyrogallol; and a compound of transition metal, such as cobalt, manganese, nickel, iron, and copper.

Laminate Film

The laminate film of the invention is produced by using the adhesive for laminating of the invention.

Examples of the film materials to be laminated by the adhesive for laminating include films of polyolefin, such as low density polyethylene, high density polyethylene, linear low density polyethylene, and polypropylene; films of polyester, such as polyethylene terephthalate and polybutylene terephthalate; films of polyamide, such as nylon 6, nylon 6,6, and m-xylylene adipamide (N-MXD6); biodegradable films of polylactic acid; polyacrylonitrile films; poly(meth)acrylic films; polystyrene films; polycarbonate films; saponified ethylene-vinyl acetate copolymer (EVOH) films; polyvinyl alcohol films; papers, such as carton; metallic foils of aluminum, copper, etc.; preceding films which are coated with a polymer, such as polyvinylidene chloride (PVDC) resin, polyvinyl alcohol resin, saponified ethylene-vinyl acetate copolymer resin, and acrylic resin; preceding films which are vapor-deposited with an inorganic compound or metal, such as silica, alumina, and aluminum; preceding films which are dispersed with inorganic filler, etc.; and preceding films which are provided with oxygen-scavenging ability. The polymer for coating may be also dispersed with inorganic filler, such as silica, alumina, mica, talc, aluminum flake, and glass flake, with layer silicate, such as montmorillonite, being preferred. The inorganic filler is dispersed by a known method, such as an extrusion kneading method and a dispersion in a resin solution by mixing. The film may be made oxygen-scavenging by forming at least a part of the film with a composition containing, for example, a low molecular weight compound reactive with oxygen, such as hindered phenols, vitamin C, vitamin E, organophosphorus compounds, gallic acid, and pyrogallol; and a compound of transition metal, such as cobalt, manganese, nickel, iron, and copper.

The thickness of the film material is about 10 to 300 µm, preferably 10 to 100 µm in view of practical use. The plastic film may be monoaxially or biaxially stretched.

To obtain an adhesive layer free from defects, such as breaking and cissing, the surface of the film material is preferably treated, for example, by flame treatment and corona discharge treatment, if necessary. The surface treatment enhances the adhesion of the adhesive layer to various kinds of film materials.

After appropriate surface treatment, a print layer may be formed on the surface of the film material, if necessary, by a printing machine which has been generally used in printing conventional polymer films, for example, a gravure printing machine, a flexographic printing machine, and an offset printing machine. Inks including a pigment, such as azo pigment and phthalocyanine; a resin, such as rosin, polyamide resin, and polyurethane; a solvent, such as methanol, ethyl acetate, and methyl ethyl ketone; and other ingredient, which are used in forming print layers on conventional polymer films, are usable.

The film material for a flexible polymer film layer which serves as a sealant layer is preferably selected from polyolefin films, such as polyethylene film, polypropylene film, and ethylene-vinyl acetate copolymer film, in view of their good heat sealability. The thickness thereof is about 10 to 300 µm and preferably about 10 to 100 µm in view of practical use. The film may be surface-treated, for example, by flame treatment and corona discharge treatment.

A primer (medium) layer may be formed on the surface before coating the adhesive. One-part and two-part primers of various types of compounds are usable as long as the adhesiveness to the substrate is good, with a polyester-based primer being practically preferred because the alcohol, such as methanol, which is suitably used as the main solvent of the adhesive, hardly penetrates. The thickness of the primer layer is preferably 0.01 to 20 µm and more preferably 0.1 to 5 µm in view of sufficient adhesiveness and uniform thickness.

The laminate film is obtained by laminating a thermoplastic resin outer layer, a heat-sealing thermoplastic resin layer, and other layer(s). At least one of the layers which form the laminate film is an adhesive layer made of the adhesive which mainly comprises the epoxy resin composition comprising an epoxy resin and the epoxy resin curing agent of the invention. An adhesive layer other than the adhesive layer made of the adhesive of the invention may be formed from other adhesive, such as polyurethane adhesive, or may be formed by a fuse-bonding resin.

The invention includes any laminate films as long as the laminate film has at least one barrier layer which comprises a cured product of the adhesive mainly comprising the epoxy resin composition of the invention. The materials of other layers may be selected from those mentioned above. For example, the invention includes a three-layered laminate: polyolefin/epoxy resin cured product/polyolefin wherein the epoxy resin cured product serves as the adhesive layer.

The lamination of various types of film materials using the adhesive mainly comprising the epoxy resin composition is conducted by a known laminating method, such as dry lamination, non-solvent lamination, extrusion lamination, with the dry lamination being preferably used in the invention in view of the viscosity of the curing agent.

The adhesive is coated on various materials and the adhesive-coated material is laminated to another material at a concentration of the epoxy resin composition and temperature, each being enough to obtain an epoxy resin cured product for forming the adhesive layer, although depending upon the ingredients of the composition and the laminating method to be used. Namely, depending upon the kinds and molar ratio of the ingredients and the laminating method to be used, the concentration of the epoxy resin composition can widely vary from the non-diluted state without a solvent to about 5% by weight when diluted with an appropriate organic solvent and/or water.

Any organic solvents are usable as long as the adhesive is soluble in the solvent. Examples the organic solvents include water-insoluble solvents, such as toluene, xylene, methyl acetate, ethyl acetate, butyl acetate, acetone, and methyl ethyl ketone; glycol ethers, such as 2-methoxyethanol, 2-ethoxyethanol, 2-propoxyethanol, 2-butoxyethanol, 1-methoxy-2-propanol, 1-ethoxy-2-propanol, and 1-propoxy-2-propanol; alcohols, such as methanol, ethanol, 1-propanol, 2-propanol, 1-butanol, and 2-butanol; and aprotic polar solvents, such as N,N-dimethylformamide, N,N-dimethylacetamide, dimethyl sulfoxide, and N-methylpyrrolidone.

The adhesive may be diluted with a solvent to give a coating solution having a concentration corresponding to a Zahn cup (No. 3) viscosity of 5 to 30 s (25° C.). If the Zahn cup (No. 3) viscosity is 5 s or higher, the adhesive is sufficiently transferred to the substrate to prevent the contamination of rolls. If the Zahn cup (No. 3) viscosity is 30 s or lower, the adhesive is sufficiently supplied to a roll and a uniform adhesive layer is easily formed. For example, in dry lamination, the Zahn cup (No. 3) viscosity is preferably kept within 10 to 20 s (25° C.) during the laminating operation.

If the adhesive diluted with a solvent is used, the solvent is removed by drying the coated adhesive at 20 to 140° C., preferably at a temperature near the boiling point of the solvent and not adversely affecting the coated substrate. If the drying temperature is less than 20° C., the solvent remains in the laminate film to make the adhesion poor and emit offensive odor. If exceeding 140° C., a laminate film with good appearance is hardly obtained because a polymer film is softened. For example, the adhesive is coated to a stretched polypropylene film preferably at 40 to 120° C.

The adhesive may be coated on a substrate by any of coating methods generally employed, such as roll coating, spray coating, air knife coating, dipping, and brush coating, with the roll coating and the spray coating being preferred. For example, the roll coating or spray coating technique and the apparatus as employed in the lamination of a polymer film coated with a polyurethane adhesive are usable.

Next, the operations of each laminating method are described in detail. In the dry lamination, the coating solution is coated on a film material, including a substrate, by a roll, such as gravure roll; removing the solvent by drying; and immediately thereafter another film material is laminated to the dried surface by a nip roll, to obtain the laminate film.

A solvent containing an alcohol having 3 or less of carbon atom is preferred for the solvent for preparing the adhesive because of its good dissolving power and relatively low boiling point, for example, a solvent containing at least one alcohol selected from the group consisting of methanol, ethanol, isopropanol, and n-propanol as the main component is preferably used. A mixed solvent further containing a solvent having any of the functional groups, such as an ester group, a ketone group, and an aldehyde group, is preferred, because these solvents slow down the reaction between the epoxy resin and the polyamine and prevent the increase in the viscosity of the adhesive, thereby to prolong the operation time. The solvent having such functional group is at least one compound having a relatively low boiling point, which is selected from the group consisting of methyl acetate, ethyl acetate, acetone, methyl ethyl ketone, acetaldehyde, and propionaldehyde.

In view of obtaining a laminate film with a smaller amount of residual solvent, the content of the solvent having any functional group of the ester group, the ketone group, and the aldehyde group is preferably 20% by weight or less on the basis of the total weight of the solvent. The residual amount of the solvent remaining in the laminate film is preferably 7 mg/m$^2$ or less for practical use. If exceeding 7 mg/m$^2$, the film develops offensive odor. To more effectively prevent the development of offensive odor, the residual amount is preferably 5 mg/m$^2$ or less and particularly preferably 3 mg/m$^2$ or less.

In the dry lamination, the adhesive may be coated on the sealant layer. For example, the laminate film is produced by coating the adhesive on a polyolefin film, such as polyethylene film, polypropylene film, and ethylene-vinyl acetate copolymer film, drying the coated adhesive, and then laminating a substrate, such as stretched polypropylene film, polyamide film, and polyethylene terephthalate film.

The nip roll to be used for lamination is heated to 20 to 120° C., preferably 40 to 100° C.

The laminate film is preferably aged at 20 to 60° C. for a predetermined period of time to complete the curing reaction, if necessary. The aging for a predetermined period of time allows the curing reaction to proceed with a sufficient conversion, thereby providing high gas-barrier properties. If aged at 20° C. or lower or not aged, the conversion of the epoxy resin composition to the cured product is low and sufficient gas-barrier properties and adhesive strength are not obtained in some cases. The aging at 60° C. or higher may cause the blocking between polymer films and the exudation of additives.

In the non-solvent lamination, the laminate film is obtained by coating the adhesive which is heated to 40 to 100° C. in advance on a film material, including a substrate, by a roll, such as gravure roll, heated to 40 to 120° C. and laminating another film material to the coated surface immediately thereafter. As in the case of the dry lamination, the laminated films are preferably aged for a predetermined period of time, if necessary.

In the extrusion lamination, the laminate film is obtained by coating an adhesive aid (anchor coat agent) comprising a diluted solution of an epoxy resin and an epoxy resin curing agent (main components of the adhesive) in an organic solvent and/or water on a film material, including a substrate, by a roll, such as a gravure roll, drying at 20 to 140° C. to remove the solvent, and then laminating a molten polymer material by an extruder. The material for the molten polymer is preferably a polyolefin resin, such as low density polyethylene resin, linear low density polyethylene resin, and ethylene-vinyl acetate copolymer resin.

The laminating methods mentioned above and other laminating methods generally used may be combined, if necessary. The layered structure of the laminate film varies depending upon its use and form.

The thickness of the adhesive layer after coating, drying, laminating, and heat-treating is 0.1 to 100 μm, preferably 0.5 to 10 μm for practical use. If being 0.1 μm or more, the gas-barrier properties and the adhesiveness are sufficient. If being 100 μm or less, an adhesive layer with a uniform thickness is easily formed.

The laminate film of the invention is excellent in the laminate strength. Although depending upon the materials forming the substrate and the sealant layer, the laminate strength measured at a peeling speed of 300 mm/min after heat treatment is preferably 80 g/15 mm or more, more preferably 100 g/15 mm or more, and particularly preferably 120 g/15 mm or more when the substrate is a stretched polypropylene film. When the substrate is a stretched nylon or polyethylene terephthalate film and the sealant layer is a low density polyethylene or non-stretched polypropylene film, the laminate strength is preferably 150 g/15 mm or more, more preferably 200 g/15 mm or more, and particularly preferably 300 g/15 mm or more. The laminate strength is measured by the method described below.

Multi-Layer Packaging Material and Packaging Bag

The laminate film of the invention produced by using the adhesive for laminating is usable as the multi-layer packaging material for protecting foods, medicines, and other products. The multi-layer packaging material of the invention includes at least one unit of the laminate film. "One unit" of the laminate film referred to herein is a three-layered structure of the adhesive layer and the films which adjoin the adhesive layer. The layered structure of the multi-layer packaging material may vary depending upon the contents, storage environment, and storage form. For example, the laminate film of the invention is directly usable as the multi-layer packaging material or the laminate film may be laminated with an additional layer, such as an oxygen-absorbing layer, a thermoplastic resin layer, a paper layer, and a metal foil layer, if necessary. The additional layer may be laminated via any of the adhesive for laminating of the invention, another adhesive, and another anchor coat agent.

Next, the packaging bag, such as a soft packaging bag, which is produced from the multi-layer packaging material is explained. If the multi-layer packaging material has a heat-sealable resin layer, the packaging bag, such as a soft packaging bag, is produced by superposing a surface of the heat-sealable resin layer on another surface of the heat-sealable resin layer and then heat-sealing the meeting peripheral edges to form a sealed portion. For example, the heat-sealable resin layers are opposed to each other by folding the multi-layer packaging material or placing two pieces of the multi-layer packaging material one over the other. The heat sealing may be done in any manner of lateral sealing, two-sided sealing, three-sided sealing, four-sided sealing, envelope sealing, pillow sealing, plait sealing, flat bottomed sealing, square bottomed sealing, gusset sealing, and other sealing manners. The shape of the packaging bag varies widely depending upon contents, usage environment, and form of use, for example, includes a self-standing packaging bag (standing pouch). Examples of the heat-sealing method include known methods, such as bar sealing, rotating roll sealing, belt sealing, impulse sealing, induction sealing, and ultrasonic sealing.

Product to be stored is put into the packaging bag from its open end and then the open end is heat-sealed, to obtain a packaged product using the packaging bag of the invention. Examples of products to be contained in the packaging bag include confectionaries, such as rice snacks, pea and bean snacks, nuts, biscuits, cookies, wafers, marshmallows, pies, soft cakes, candies, and snacks; staple foods, such as breads, snack noodles, instant noodles, dried noodles, pastas, aseptic-packaged cooked rice, Japanese rice soups, rice gruels, Japanese rice cakes, and cereal foods; processed agricultural products, such as pickles, boiled legumes, fermented soybeans, fermented soybean pastes, freeze-dried bean curd, bean curd, cooked mushroom, konjac gels, processed wild plants, jams, pea nut creams, salads, frozen vegetables, and processed potato products; processed animal source products, such as hams, bacons, sausages, chicken products, and corned beefs; processed marine products, such as fish hams or sausages, fish paste products, steamed fish paste, edible seaweeds, tsukudani, dried, fermented, and smoked bonito, salted, fermented viscera of marine animals, smoked salmons, and marinated spicy roe of pollock; fruits such as peaches, mandarins, pineapples, apples, European pears, and cherries; vegetables, such as corn, asparagus, mushroom, onions, carrots, white radishes, and potatoes; cooked foods, for example, frozen or chilled dishes, such as hamburger steaks, meatballs, deep fried sea foods, Chinese dumplings, and Japanese croquettes; dairy products, such as butter, margarine, cheese, cream, instant creamy powder, and powdered infant formula; and foods, such as liquid condiment, curry in retort pouch, and pet food. The packaging material is also usable for packaging cigarette, disposable heating pads, medicines, and cosmetics.

EXAMPLES

The present invention is described in more detail with reference to the examples. However, it should be noted that the scope of the invention is not limited to the examples.

The epoxy resin curing agents A to E were prepared by the following methods.

Epoxy Resin Curing Agent A

In to a reaction vessel, one mole of m-xylylenediamine and 0.25 mol of dimethyl isophthalate were charged. Under nitrogen flow, the temperature was raised to 60° C. and 0.65 mol of methyl acrylate was added dropwise over one hour. The temperature was raised to 165° C. while distilling off the methanol being eliminated and then kept at 165° C. for 2.5 h. An amount of methanol corresponding to 65% of the solid concentration was added dropwise over 1.5 h, thereby obtaining the epoxy resin curing agent A.

Epoxy Resin Curing Agent B

In to a reaction vessel, one mole of m-xylylenediamine and 0.25 mol of dimethyl isophthalate were charged. Under nitrogen flow, the temperature was raised to 60° C. and 0.60 mol of methyl acrylate was added dropwise over one hour. The temperature was raised to 165° C. while distilling off the methanol being eliminated and then kept at 165° C. for 2.5 h. An amount of methanol corresponding to 65% of the solid concentration was added dropwise over 1.5 h, thereby obtaining the epoxy resin curing agent B.

Epoxy Resin Curing Agent C

In to a reaction vessel, one mole of m-xylylenediamine and 0.25 mol of isophthalic acid were charged. Under nitrogen flow, the temperature was raised to 220° C. and kept there for 0.5 h. After cooling to 60° C., 0.60 mol of methyl acrylate was added dropwise over one hour. The temperature was raised to 165° C. while distilling off the methanol and water being eliminated and then kept at 165° C. for 2.5 h. An amount of methanol corresponding to 65% of the solid concentration was added dropwise over 1.5 h, thereby obtaining the epoxy resin curing agent C.

Epoxy Resin Curing Agent D

In to a reaction vessel, one mole of m-xylylenediamine and 0.25 mol of dimethyl terephthalate were charged. Under nitrogen flow, the temperature was raised to 220° C. and kept there for 0.5 h. After cooling to 60° C., 0.60 mol of methyl acrylate was added dropwise over one hour. The temperature was raised to 165° C. while distilling off the methanol being eliminated and then kept at 165° C. for 2.5 h. An amount of methanol corresponding to 65% of the solid concentration was added dropwise over 1.5 h, thereby obtaining the epoxy resin curing agent D.

Epoxy Resin Curing Agent E

In to a reaction vessel, one mole of m-xylylenediamine was charged. Under nitrogen flow, the temperature was raised to 60° C. and 0.93 mol of methyl acrylate was added dropwise over one hour. The temperature was raised to 165° C. while distilling off the methanol being eliminated and then kept at 165° C. for 2.5 h. An amount of methanol corresponding to 65% of the solid concentration was added dropwise over 1.5 h, thereby obtaining the epoxy resin curing agent E.

The gas-barrier properties and laminate strength were evaluated by the following methods.

Oxygen Permeability Coefficient (ml·mm/m²·day·MPa)

The oxygen permeability of each of the substrate described below and the laminate film obtained by coating the coating solution (epoxy resin composition) mentioned below on the substrate and curing the coated solution was measured at 23° C. and relative humidity of 60% by using an oxygen permeation analyzer (OX-TRAN 2/21 manufactured by Modern Controls, Inc.). The oxygen permeability coefficient of the coated film was determined from the following equation:

$$1/R_1 = 1/R_2 + DFT/P$$

wherein:

$R_1$ is the oxygen permeability (ml/m²·day·MPa) of the laminate film;

$R_2$ is the oxygen permeability (ml/m²·day·MPa) of the substrate;

DFT is the thickness (mm) of the coated film; and

P is the oxygen permeability coefficient of the coated film.

Substrate: biaxially stretched nylon film having a thickness of 15 μm (N1102 manufactured by Toyobo Co., Ltd.).

Coating Solution: an ethyl acetate solution (solid concentration: 30% by weight) of a polyurethane adhesive composed of 50 parts by weight of a polyether component (TM-319 manufactured by Toyo Morton Co., Ltd.) and 50 parts by weight of a polyisocyanate component (CAT-19B manufactured by Toyo Morton Co., Ltd.).

Laminate Film: The coating solution was coated on the substrate and dried at 85° C. Then, a stretched ester film of 12 μm thick (E5200 manufactured by Toyobo Co., Ltd.) was laminated by nip roll and aged at 40° C. for 2 days.

Coating method: bar coater No. 8

Solid Concentration of Coating Solution: 30%

Laminate Strength (g/15 mm)

The laminate strength of a laminate film was measured according to JIS K-6854 (T-peel test) at a peeling speed of 300 mm/min.

Example 1

A solution containing 461 parts by weight of the epoxy resin curing agent A, 50 parts by weight of an epoxy resin having a glycidylamino group derived from m-xylylenediamine (TETRAD-X manufactured by Mitsubishi Gas Chemical Company, Inc.), 480 parts by weight of methanol, and 69 parts by weight of ethyl acetate was prepared. Into the solution, 0.1 part by weight of a silicone defoaming agent (BYK065 manufactured by BYK-Chemie GmbH) was added and the resultant mixture was stirred sufficiently, to obtain a coating solution (number of active amine hydrogens in curing agent A/number of epoxy groups in epoxy resin=7.24). An ethyl acetate solution (solid concentration: 30% by weight) of a polyurethane adhesive composed of 50 parts by weight of a polyether component (TM-319 manufactured by Toyo Morton Co., Ltd.) and 50 parts by weight of a polyisocyanate component (CAT-19B manufactured by Toyo Morton Co., Ltd.) was coated on a biaxially stretched nylon film with 15 μm thick (N1102 manufactured by Toyobo Co., Ltd.). After drying at 85° C. for 10 s, a stretched ester film with 12 μm thick (E5200 manufactured by Toyobo Co., Ltd.) was laminated by a nip roll and aged at 40° C. for 2 days, to obtain a laminate film. The coating solution was coated on the ester film of the obtained laminate film by a bar coater No. 8 (coated amount: 3 g/m² (solid basis)). After drying at 85° C. for 10 s, a linear low density polyethylene film with 40 μm thick (TUX-MCS manufactured by Tohcello Co., Ltd.) was laminated by a nip roll and aged at 40° C. for 2 days, to obtain a final laminate film. The results of evaluation are shown in Table 1.

Example 2

The production procedure of Example 1 was repeated except for using 444 parts by weight of the epoxy resin curing agent B in place of the epoxy resin curing agent A, 454 parts by weight of methanol, and 66 parts by weight of ethyl acetate. The ratio, number of active amine hydrogens in curing agent B/number of epoxy groups in epoxy resin, was 7.33. The results are shown in Table 1.

Example 3

The production procedure of Example 1 was repeated except for using 851 parts by weight of the epoxy resin curing agent C in place of the epoxy resin curing agent A, 710 parts by weight of methanol, and 112 parts by weight of ethyl acetate. The ratio, number of active amine hydrogens in curing agent C/number of epoxy groups in epoxy resin, was 12.22. The results are shown in Table 1.

Example 4

The production procedure of Example 1 was repeated except for using 444 parts by weight of the epoxy resin curing agent D in place of the epoxy resin curing agent A, 454 parts by weight of methanol, and 66 parts by weight of ethyl acetate. The ratio, number of active amine hydrogens in curing agent D/number of epoxy groups in epoxy resin, was 7.33. The results are shown in Table 1.

Example 5

The production procedure of Example 1 was repeated except for using a biaxially stretched nylon film with 15 μm thick (N1200 manufactured by Toyobo Co., Ltd.) as the substrate in place of the ester film. The results are shown in Table 1.

Comparative Example 1

The production procedure of Example 1 was repeated except for using 407 parts by weight of the epoxy resin curing agent E in place of the epoxy resin curing agent A, 378 parts by weight of methanol, and 58 parts by weight of ethyl acetate. The ratio, number of active amine hydrogens in curing agent E/number of epoxy groups in epoxy resin, was 3.39. The results are shown in Table 1.

Comparative Example 2

The production procedure of Example 1 was repeated except for using, in place of the coating solution used in Example 1, an ethyl acetate solution (solid concentration: 30% by weight) of a polyurethane adhesive composed of 50 parts by weight of a polyether component (TM-319 manufactured by Toyo Morton Co., Ltd.) and 50 parts by weight of a polyisocyanate component (CAT-19B manufactured by Toyo Morton Co., Ltd.). The results are shown in Table 1.

TABLE 1

|  | Oxygen Permeability Coefficient (ml · mm/m² · day · MPa) | Laminate Strength (g/15 mm) |
|---|---|---|
| Example 1 | 0.39 | 400 |
| Example 2 | 0.44 | 600 |
| Example 3 | 0.50 | 300 |
| Example 4 | 0.47 | 300 |
| Example 5 | 0.40 | 400 |
| Comparative Example 1 | 0.46 | 20 |
| Comparative Example 2 | >2 | 260 |

What is claimed is:

1. An epoxy resin composition comprising an epoxy resin and an epoxy resin curing agent comprising a reaction product of components (A), (B), and (C):
   (A) m-xylylenediamine;
   (B) acrylic acid, methacrylic acid, an ester thereof, an amide thereof, an acid anhydride thereof, or an acid chloride thereof; and
   (C) isophthalic acid, terephthalic acid, an ester thereof, an amide thereof, an acid anhydride thereof, or an acid chloride thereof,
   wherein
   a reaction molar ratio of the component (C) and the component (A), (C)/(A), is 0.10 to 0.25, and
   a ratio of a number of active amine hydrogens in the epoxy resin curing agent to a number of epoxy groups in the epoxy resin:
   Number of active amine hydrogens in epoxy resin curing agent/Number of epoxy groups in epoxy resin
   is 7.24 to 30.0.

2. The epoxy resin composition according to claim 1, wherein a cured product of the epoxy resin composition has an oxygen permeability coefficient of 2.0 ml·mm/m²·day·MPa or less at 23° C. and 60% RH.

3. The epoxy resin composition according to claim 1, wherein the epoxy resin is at least one resin selected from the group consisting of an epoxy resin having a glycidylamino group derived from m-xylylenediamine, an epoxy resin having a glycidylamino group derived from 1,3-bis(aminomethyl)cyclohexane, an epoxy resin having a glycidylamino group derived from diaminodiphenylmethane, an epoxy resin having a glycidylamino group and/or a glycidyloxy group each derived from p-aminophenol, an epoxy resin having a glycidyloxy group derived from bisphenol A, an epoxy resin having a glycidyloxy group derived from bisphenol F, an epoxy resin having a glycidyloxy group derived from phenol novolac, and an epoxy resin having a glycidyloxy group derived from resorcinol.

4. The epoxy resin composition according to claim 1, wherein the epoxy resin is an epoxy resin having a glycidylamino group derived from m-xylylenediamine.

5. An adhesive for laminating which mainly comprises the epoxy resin composition according to claim 1.

6. A laminate film produced by using the adhesive for laminating according to claim 5.

7. A multi-layer packaging material comprising at least one unit of the laminate film according to claim 6.

8. A packaging bag produced from the multi-layer packaging material according to claim 7 having a heat-sealable resin layer, wherein the packaging bag is produced by superposing a surface of the heat-sealable resin layer on another surface of the heat-sealable resin layer and heat-sealing a meeting peripheral edge to form a sealed portion.

* * * * *